(12) United States Patent
Ekman et al.

(10) Patent No.: US 12,125,996 B2
(45) Date of Patent: Oct. 22, 2024

(54) PROCESS FOR RECOVERING COMPONENTS FROM ALKALINE BATTERIES

(71) Applicant: Fortum Oyj, Espoo (FI)

(72) Inventors: Peik Ekman, Espoo (FI); Kenneth Ekman, Espoo (FI); Pasi Kauppinen, Espoo (FI); Paula Kivelä, Espoo (FI); Elina Lappalainen, Espoo (FI)

(73) Assignee: Fortum Oyj, Espoo (FI)

( * ) Notice: Subject to any disclaimer, the term of this patent is extended or adjusted under 35 U.S.C. 154(b) by 548 days.

(21) Appl. No.: 17/238,955

(22) Filed: Apr. 23, 2021

(65) Prior Publication Data
US 2021/0344059 A1   Nov. 4, 2021

(30) Foreign Application Priority Data
Apr. 30, 2020  (FI) ................................. 20205447

(51) Int. Cl.
*H01M 10/54* (2006.01)
*B01D 9/00* (2006.01)
(Continued)

(52) U.S. Cl.
CPC .......... *H01M 10/54* (2013.01); *B01D 9/0031* (2013.01); *B01J 45/00* (2013.01); *C22B 7/007* (2013.01);
(Continued)

(58) Field of Classification Search
CPC ...... H01M 10/54; H01M 6/52; B01D 9/0031; B01D 2009/0086; B01J 45/00; C22B 7/007; C22B 19/22; C22B 26/22; C22B 11/042; C22B 47/0009; C22B 3/04; C22B 47/00; C22B 19/00; C22B 19/26; C22B 19/30; C22B 3/42; C22B 26/00; C22B 26/10;
(Continued)

(56) References Cited

U.S. PATENT DOCUMENTS 5,453,111 A    9/1995  Myerson et al.
8,586,218 B1  11/2013  Smith et al.
(Continued)

FOREIGN PATENT DOCUMENTS

CN   107815550 B   7/2019
EP     2631987 A1  8/2013
(Continued)

OTHER PUBLICATIONS

Sayilgan et al. (Hydrometallurgy 97 (2009) 158-166) (Year: 2009).*
(Continued)

*Primary Examiner* — Milton I Cano
*Assistant Examiner* — Joshua P McClure
(74) *Attorney, Agent, or Firm* — Laine IP Oy

(57) ABSTRACT

The present invention relates to separation and recovery of metals from ground alkaline batteries using anode mud (zinc electrolysis waste) and other manganese and zinc containing materials. The material commonly referred to as alkaline black (AKB) is solubilized into sulfate media and the manganese to zinc ratio is adjusted. The solution containing metals is processed using crystallization and ion exchange methods to produce manganese sulfate and zinc sulfate solutions for several possible applications.

19 Claims, 2 Drawing Sheets

(51) Int. Cl.
*B01J 45/00* (2006.01)
*C22B 3/00* (2006.01)
*C22B 7/00* (2006.01)
*C22B 26/22* (2006.01)

(52) U.S. Cl.
CPC .............. *C22B 19/22* (2013.01); *C22B 26/22* (2013.01); *B01D 2009/0086* (2013.01)

(58) Field of Classification Search
CPC .... C22B 47/0054; Y02P 10/20; Y02W 30/84; C25C 1/00; C25C 1/16
See application file for complete search history.

(56) References Cited

U.S. PATENT DOCUMENTS

| | | | |
|---|---|---|---|
| 10,995,014 B1 * | 5/2021 | Fraser | ................. C22B 47/0054 |
| 2013/0209336 A1 | 8/2013 | Harrison et al. | |
| 2017/0170532 A1 | 6/2017 | Blais et al. | |

FOREIGN PATENT DOCUMENTS

| | | | |
|---|---|---|---|
| FI | 127830 B | 3/2019 | |
| WO | WO2013124399 A1 | 8/2013 | |
| WO | WO-2019150005 A1 * | 8/2019 | ............... C05D 9/00 |

OTHER PUBLICATIONS

Lenntech et al. (Lenntech DowexTM M4195, 2013 as provided by the Wayback Machine) (Year: 2013).*
Buzatu et al. (Journal of Power Sources 247 (2014) 612-617) (Year: 2014).*
Sayilgan et al.: Acidic leaching and precipitation of zinc and manganese from spent battery powders using various reductants. Journal of Hazardous Materials, Jan. 15, 2010, vol. 173, No. 1-3, pp. 137-143.
Senanayake et al.: Comparative leaching of spent zinc-manganese-carbon batteries using sulfur dioxide in ammoniacal and sulfuric acid solutions. Hydrometallurgy, Dec. 1, 2010, vol. 105, No. 1-2, pp. 36-41.
Lannoo et al: An environmentally friendly closed loop process to recycle raw materials from spent alkaline batteries. Journal of Cleaner Production, Nov. 2019, vol. 236, No. 117612, pp. 1-10.

* cited by examiner

PROCESS FOR RECOVERING COMPONENTS FROM ALKALINE BATTERIES

FIELD OF THE INVENTION

The present invention relates to separation and recovery of metals from ground alkaline batteries using anode mud (zinc electrolysis waste) and other manganese and zinc containing materials. The material commonly referred to as alkaline black (AKB) is solubilized into sulfate media, and the manganese to zinc ratio is adjusted. The solution containing metals is then processed using crystallization and ion exchange methods to produce manganese sulfate and zinc sulfate solutions for several possible applications.

BACKGROUND OF THE INVENTION

Electrification of transport is increasing power storage requirements by volumes and by capacity. Electricity for e.g. electric vehicles is stored in Li-ion batteries, which typically contain lithium, manganese, nickel and cobalt. These metals are currently coming from primary sources, i.e. mining, which are energy intensive and natural resource exhaustive processes. With increased demand for battery metals, the importance of secondary sources for these elements is increasing. Efficient utilisation of secondary metal sources allows cost and energy efficient production of battery metals salts, at the same time saving natural resources. For manganese, there are several secondary sources available.

A large secondary source for manganese comes from the recycling process of zinc-manganese dioxide batteries, i.e. alkaline batteries. "Black mass" from alkaline batteries (alkaline black, AKB) is generated by crushing the batteries and sieving the resulting material to separate the casing and organics from the cathode and anode material. Currently metals from black mass are recovered by pyrometallurgical routes (smelting) or by combination of thermal and hydrometallurgical treatments. Hydrometallurgical routes typically involve selective solvent extractions and precipitations. According to an international patent application, WO2013124399A1, alkaline black is first washed with water to separate potassium as a hydroxide solution. Then the alkaline black is reduced with hydrogen gas, followed by an ammonia leaching step which selectively leaches zinc from the material. The ammonia is evaporated, and zinc is recovered as a hydroxide filter cake. The zinc-depleted alkaline black then undergoes a reductive leach with sulfuric and citric acid, which dissolves manganese as manganese sulfate, which is then separated by filtration. The filtrate is then mixed with sodium carbonate to precipitate manganese as manganese carbonate and separated from the sodium sulfate wastewater by filtration.

In the final stage of the zinc refining process, electrolysis, impurities are deposited as solid waste in the vicinity of the anode. This mass is called anode mud (AM) and is removed frequently from the process. Main components of the anode mud are manganese, lead, zinc and minor amounts of other elements such as iron and calcium. Anode mud is classified as hazardous and needs to be landfilled securely. Current utilisation routes typically are based on pyrometallurgy. In hydrometallurgical routes metals can be recovered from anode mud by dissolving with sulfuric acid, separating lead sulfate and other main impurities as solid residue and purifying dissolved manganese sulfate with further hydrometallurgical steps.

In a study published 2019 in Journal of Cleaner Production, S. Lannoo et al. describe a process in which ion exchange resins have been used to separate zinc traces from highly concentrated manganese liquor, which was obtained from a solvent exchange process.

FI127830 discloses a method for preprocessing an alkaline black mass of spent alkaline batteries. The pre-processed alkaline black mass is meant for a leaching process to recover one or more metals from preprocessed alkaline black mass. The invention also relates to a method, device and system for processing a black mass of spent alkaline batteries. In this process, the alkaline black is first calcined to remove graphite and organics, and then the resulting material is leached with sulfuric and citric acid. Impurities are filtered, and the resulting manganese and zinc sulfate solution, containing citric acid, is either used as such as a fertilizer, or zinc is separated as hydroxide by precipitation and filtration.

In the process according to the present invention the expensive solvent exchange step is avoided by dissolving AKB directly with sulfuric acid to obtain manganese and zinc rich filtrate. The calcination process is also avoided, which results in a lower $CO_2$-impact as well as the possibility of reusing the graphite. By using ion exchange as a manganese and zinc separation method, filtration steps are also avoided. The manganese to zinc ratio is adjusted with other manganese-containing materials, so that the final ratio is in favour of manganese, for example using anode mud. These liquors are then subjected to a hot crystallization method and an ion exchange process to separate manganese and zinc by capturing zinc with a chelating ion exchange resin and leaving purified manganese sulfate solution. The raffinate containing manganese sulfate is then drained from the column and zinc can be eluted from the resin. Additionally, it is discovered that by preconditioning the ion exchange resin using a hydroxide solution, zinc binding is enhanced.

SUMMARY OF THE INVENTION

The method for recovering metals from ground alkaline batteries according to the present invention comprises the steps of (a) selectively leaching under reductive conditions manganese and zinc from alkaline black by mixing the alkaline black and a manganese oxide containing material and/or manganese sulfate with a sulfuric acid solution at a leaching temperature of 15-40° C., for 1-5 hours to obtain a mixture; (b) filtering the mixture to obtain a manganese and zinc sulfate filtrate and a Pb/Ca/organics as a filter cake; (c) heating the manganese and zinc sulfate filtrate to a crystallization temperature of 70-100° C. and keeping the crystallization temperature under reflux cooling for at least 30 minutes to precipitate manganese in a form of sulfate crystals; (d) filtrating the sulfate crystals and obtaining a manganese depleted filtrate and finally; (e) solubilizing the sulfate crystals in water to obtain a sulfate solution and separating manganese and zinc by a chelating ion exchange.

The reductive conditions in the selective leaching step (step a) can be obtained by adding a reducing agent such as hydrogen peroxide or sulfur dioxide during the mixing until manganese and zinc are dissolved.

According to one embodiment the manganese oxide containing material is manganese dioxide ($MnO_2$) such as anode mud. In another embodiment the manganese oxide containing material is manganese trioxide.

According to an embodiment of the recovering method of the present invention the manganese and zinc sulfate filtrate obtained in the filtering step (step b) has a manganese to zinc ratio (Mn:Zn-ratio) between 10:1 and 3.6:1.

In another embodiment the manganese and zinc sulfate filtrate obtained in the filtering step (step b) has a manganese to zinc ratio (Mn:Zn-ratio) between 7:1 and 5:1.

According to the present invention manganese sulfate can be added in a stage preceding the chelating ion exchange to adjust the manganese to zinc ratio.

If the feed manganese materials contain impurities that precipitate at neutral pH, the pH of the mixture to be filtered in the filtering step (step b) is adjusted to be between 1.5 and 7. The pH can be adjusted upwards with a hydroxide solution such as $NH_4OH$, NaOH or KOH, or downwards with sulfuric acid preceding the mentioned filtering step (step b).

According to another embodiment the pH adjustment can be done in any stage preceding the chelating ion exchange in step (e). Thus, the sulfate solution, wherefrom manganese and zinc are separated by a chelating ion exchange, has a pH between 1.5 and 7 before entering the ion exchange stage. The pH can be adjusted upwards with a hydroxide solution such as $NH_4OH$, NaOH or KOH, or downwards with sulfuric acid.

The alkaline black can be washed before the selective leaching step (step a) by mixing the alkaline black with water at a temperature between 5° C. and 100° C. for at least 30 min. According to one embodiment the alkaline black is mixed with water at a temperature between 20° C. and 25° C. In one embodiment the alkaline black is washed by mixing it with water for 1-2 hours.

In the method for recovering according to the present invention the manganese depleted filtrate obtained from the filtrating of the sulfate crystals (step d) can be returned to the leaching step (step a).

According to one embodiment of the present invention a BPA-resin in sulfate form is used in the chelating ion exchange step. The BPA-resin can be preconditioned with ammonium, sodium or potassium hydroxide.

DEFINITIONS

AKB means alkaline black i.e. crushed alkaline batteries.

AM means anode mud that is generated as waste in zinc electrolysis.

BPA is bis-picolyl amine that is used e.g. as an ion-exchange resin.

DC means dry content.

ICP-MS means Inductively Coupled Plasma Mass Spectrometer.

IEX cycle means the full ion exchange process, including preconditioning, loading, elution and regeneration.

$Mn_xO_y$-containing material i.e. manganese oxide containing material, which can be e.g. anode mud or manganese trioxide.

MP-AES means Microwave Plasma Atomic Emission Spectrometer.

Room temperature (RT) means temperature, which is in the range of 20° C. and 25° C.

DETAILED DESCRIPTION OF THE INVENTION

Typically, alkaline black (AKB) is expected to contain 20-40 wt % of graphite and organics that are burned off when calcinating at a temperature greater than 600° C. The calcinated AKB is expected to contain 30-45 wt % zinc oxide, 25-30 wt % manganese oxide and 7-12 wt % potassium hydroxide. It also contains less than 1 wt % of other impurities such as iron, calcium and magnesium also in the form of oxides. The rest can be assumed to be oxygen in the form of metal oxides, as well as moisture. Alkaline mud (AM) contains manganese, zinc and lead in the form of oxides and calcium in the form of sulfate. AM is expected to contain between 25-40 wt % water. In the dry form, AM is expected to contain 30-40 wt % manganese, 3-6 wt % lead, 2-4 wt % calcium and 0.5-1 wt % zinc in the form of oxides. It also contains less than 0.2 wt % of other elements such as iron and magnesium. The rest can be assumed to be oxygen in the form of oxides, as well as moisture.

Figure 1:
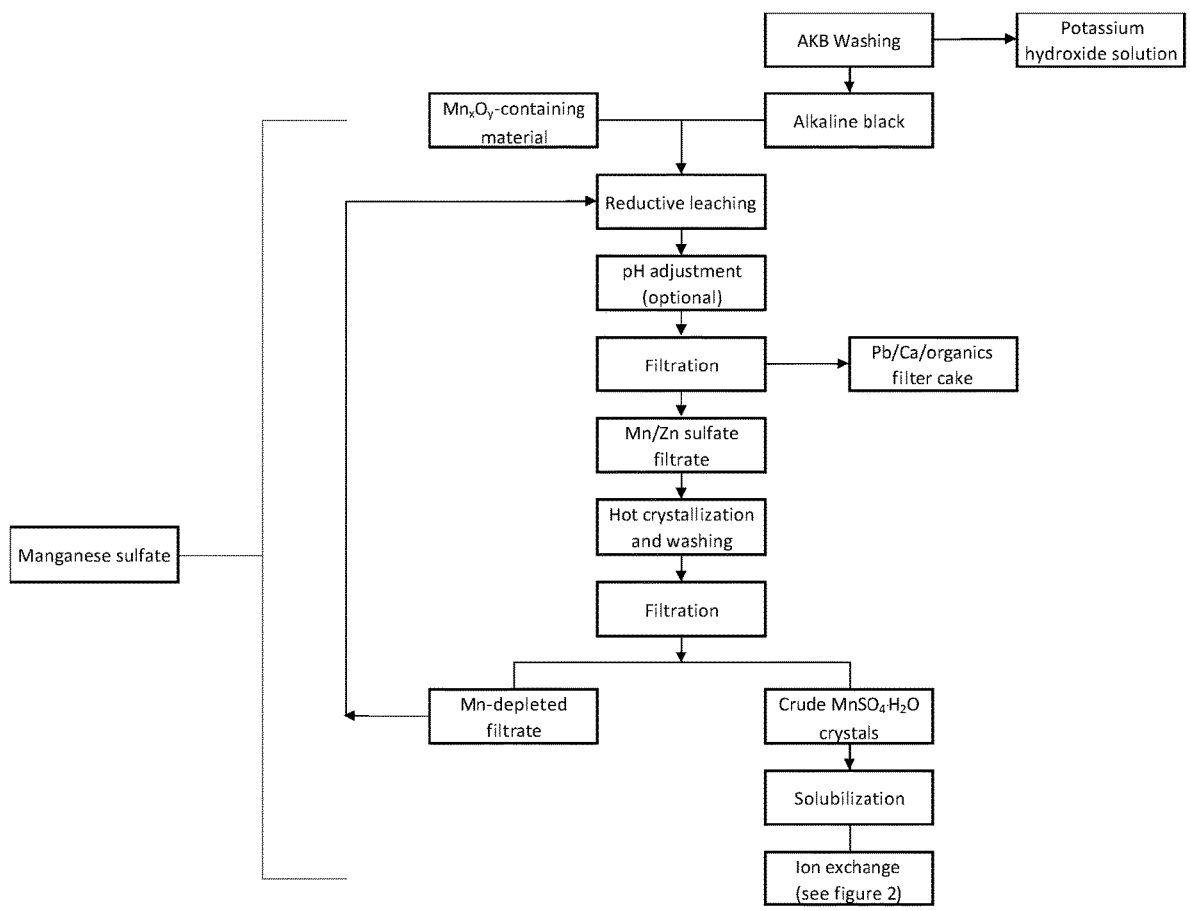
FIG. 1. A schematic flow chart of a method according to the present invention for recovering components from alkaline batteries FIG. 2. A schematic flow chart of an ion exchange cycle according to the present invention
Figure 2:
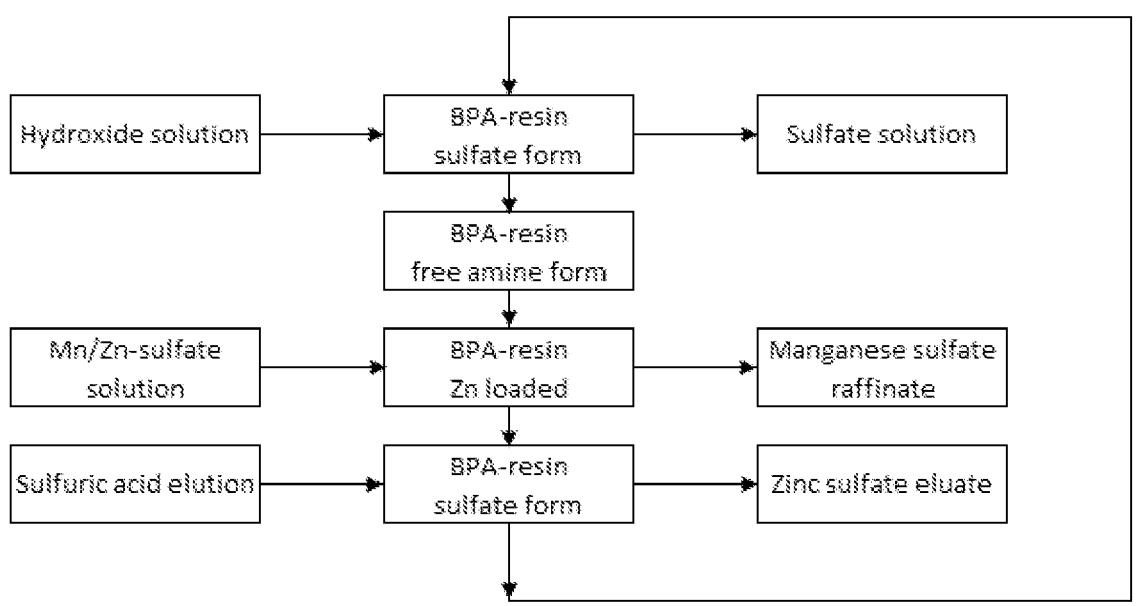

The process is now described in detail referring to the schematic flow charts of FIGS. 1 and 2.

According to the present invention alkaline black can be washed with water (AKB Washed) as an optional pre-step of the recovery process. The wash is done if the manganese sulfate obtained as an end product in the process cannot contain potassium. During this optional washing step potassium hydroxide (KOH) is solubilized from alkaline black when mixing AKB with water at a temperature between 5° C. and 100° C., preferably at a temperature between 20° C. and 25° C. for at least 30 min, preferably 1-2 hours. Washed AKB is then separated from the wash water by filtration, and the wash water (Potassium hydroxide solution) can be reused for washing another batch of AKB. It is possible to circulate this wash water to the following batch to increase the KOH-concentration depending on the final use of the potassium hydroxide solution, such as crystallization.

The AKB washing step is optional and alkaline black can also be used as such.

In the first step (step a) of the recovery process according to the invention, manganese and zinc are selectively leached (Reductive leaching) from AKB by mixing AKB and manganese oxide containing material ($Mn_xO_y$-containing material), e.g. anode mud or manganese trioxide ($Mn_2O_3$) and/or manganese sulfate, with sulfuric acid solution. The manganese concentration of the resulting filtrate is 100-180 g/l, preferably 140-150 g/l and zinc concentration is 10-50 g/l, preferably 20-30 g/l. The filtrate has a density of 1.38-1.47 g/l, preferably 1.4-1.45 g/l. Thus, the manganese to zinc ratio (Mn:Zn-ratio) is 10:1-3.6:1, preferably 7:1-5:1. A reducing agent such as hydrogen peroxide or sulfur dioxide is added during the mixing until manganese and zinc are dissolved. This can be determined by measuring the redox potential of the solution. The mixture is kept at 15-40° C., preferably at 20-30° C., during the mixing and the mixing is continued for 1-5 hours, preferably 2-3 hours.

Then in the second step (step b) the mixture is filtered obtaining a manganese and zinc sulfate solution as a filtrate (Mn/Zn sulfate filtrate) with a pH of 1.5-7, preferably 2-6, and a Pb/Ca/organics as a filter cake. The Pb/Ca/organics filter cake can be used in graphite production as a raw material, or used in a lead smelter to recover lead.

If pH is not in the correct area, it can be adjusted, optionally, upwards with a hydroxide solution such as $NH_4OH$, NaOH or KOH, or downwards with sulfuric acid. The pH adjustment is done to ensure that the pH is correct for ion exchange, as well as to precipitate impurities present in the feed material. pH adjustment can be done in any step before ion exchange. In an embodiment, the pH adjustment may be done before filtration of the Pb/Ca/organics-residue, i.e. prior to step (b). This may be advantageous, when the feed manganese materials contain impurities that precipitate at neutral pH.

In the following step of the recovery process according to the invention (step c), the manganese and zinc sulfate filtrate is heated in a method referred to as hot crystallization and washing which precipitates manganese in the form of sulfate crystals (Crude $MnSO_4 \cdot H_2O$ crystals). During this step the mixture is heated to 70-100° C., preferably to 80-100° C., and kept at the required temperature for at least 30 minutes, preferably 1-2 hours, under reflux cooling to avoid water vaporization, which could lead to impurities precipitating into the crystals.

The crystals are then separated from the process liquid by filtration (step d), obtaining crude $MnSO_4 \cdot H_2O$ crystals as a filter cake and Mn-depleted solution as a filtrate, which can be recycled to the reductive leaching step.

In the following step of the recovery process according to the invention (step e), the $MnSO_4 \cdot H_2O$ crystals are solubilized in water to a desired concentration of manganese, preferably 80-100 g/l. Zinc is then separated from the manganese sulfate solution by chelating ion exchange (see FIG. 2.). The bis-picolyl amine resin (BPA-resin; sulfate form) is first preconditioned with ammonium, sodium or potassium hydroxide (Hydroxide solution) and an ammonium, sodium or potassium sulfate solution (Sulfate solution) is received as a product and the resin is transformed into a free amine form (BPA-resin; free amine form). Then the zinc-containing manganese sulfate (Mn/Zn-sulfate solution) is passed through the resin (BPA-resin; Zn loaded). A manganese sulfate raffinate is received as product. Zinc is eluted from the resin (BPA-resin; sulfate form) using a 10-30 wt-%, preferably 15-25%, sulfuric acid solution (Sulfuric acid elution), and a zinc sulfate eluate is received as a product. After zinc elution the resin is ready for another cycle starting with preconditioning.

According to one embodiment of the invention, other manganese dioxide is used instead of anode mud in the leaching step i.e. in the first step of the recovery process.

In another embodiment of the invention, manganese sulfate is added to increase manganese sulfate concentration in the process liquor in any step before ion exchange.

Next, the invention is described with reference to the following examples, which are not intended to limit the scope of the invention.

EXAMPLES

Metal compositions of alkaline black, anode mud, manganese oxide and manganese sulfate used in disclosed examples are presented in Table 1. Metal compositions of AKB (before and after washing), anode mud (AM), manganese trioxide (Mn2O3) and manganese sulfate (MnSO4·H2O) analysed with MP-AES and values given in mg/kg.

150.76 g of alkaline black was slurried in 100 ml of water and was then left in stirring at room temperature for one and a half hours. After leaching solids were separated from liquid by filtration. The wash water was analysed with MP-AES (microwave plasma atomic emission spectrometer, Agilent Technologies) and is presented in Table 2. It is possible to circulate this wash water to the following batch to increase the KOH concentration.

TABLE 1

Metal compositions of AKB (before and after washing), anode mud (AM), manganese trioxide ($Mn_2O_3$) and manganese sulfate ($MnSO_4 \cdot H_2O$) analysed with MP-AES and values given in mg/kg.

| Element | AKB | AKB, washed | AM | $Mn_2O_3$ | $MnSO_4 \cdot H_2O$ |
|---|---|---|---|---|---|
| Ca | <5000 | <5000 | 20 996 | <5000 | 1 837 |
| K | 38 800 | 8 940 | 4 669 | <5000 | 620 |
| Mn | 311 300 | 328 600 | 214 020 | 652 000 | 320 000 |
| Pb | <200 | <200 | 28 188 | <200 | <200 |
| Zn | 174 100 | 150 700 | 6 032 | <5000 | <500 |

TABLE 2

Composition of AKB wash water

| Element | mg/l |
|---|---|
| K | 21 500 |
| Mn | <5 |
| Pb | 23 |
| Zn | <250 |

Example 1

51.79 g of AM and 18.85 g of washed and dried AKB were mixed with 50 ml of water and 40 ml of 95 wt % sulfuric acid. 30 ml of 30 wt % $H_2O_2$ was added gradually during 2 hours, after which the mixture was left to dissolve at room temperature for half an hour. Mixture was filtered, and 130 ml of filtrate and 9.9 g of residue was recovered and analysed with MP-AES. As lead is difficult to measure with MP-AES when manganese is present in large quantities due to overlapping signals, lead was measured with ICP-MS to ensure it does not dissolve into the leachate. In following experiments, it is assumed lead does not dissolve in this step. Results are presented in Tables 3a and 3b.

TABLE 3a

Composition of the Mn/Zn sulfate filtrate

| Element | mg/l |
|---|---|
| Ca | <500 |
| K | 3 090 |
| Mn | 97 100 |
| Pb | <30 |
| Zn | 22 900 |

TABLE 3b

Composition of the residue i.e. Pb/Ca/organics filter cake.

| Element | mg/kg |
|---|---|
| Ca | 32 100 |
| K | 612 |
| Mn | 8 480 |
| Pb | 43 400 |
| Zn | 4 040 |

120 ml of filtrate from the previous step was heated to boiling under continuous mixing and reflux cooling. After 1 hour of boiling, mixture was filtered. The resulting crystals were left to dry at room temperature and analysed with MP-AES. Results are presented in Table 4.

TABLE 4

Composition of manganese sulfate crystals

| Element | mg/kg |
| --- | --- |
| Ca | <5 000 |
| K | <500 |
| Mn | 235 000 |
| Zn | 19 100 |

13 g of manganese sulfate crystals were dissolved in 40 ml water and pH was increased to 2.5 with 24 wt % $NH_4OH$. 10 ml of Lanxess MonoPlus TP220 (bis-picolyl amine functional group) was washed with 20 ml of 24 wt % $NH_4OH$ and 20 ml of water. The manganese sulfate solution was passed through the resin. 20 ml of 20 wt % $H_2SO_4$ was used to extract zinc from the resin. Samples were analysed with MP-AES and results are presented in Table 5.

TABLE 5

Composition of the dissolved manganese sulfate liquor, raffinate and eluate.

| Element | Liquor | Raffinate | Eluate |
| --- | --- | --- | --- |
| Ca | <500 | <500 | <60 |
| K | 1 040 | 530 | <60 |
| Mn | 39 710 | 27 320 | 30 |
| Zn | 4 900 | <50 | 6 150 |

Example 2

23.02 of washed AKB (DC 88.62%) and 13.03 g of a manganese trioxide ($Mn_2O_3$) was slurried in 55 ml of water and 20 ml of 95 wt % $H_2SO_4$. 30 wt % $H_2O_2$ was added gradually for three and half hours without additional heating. pH of the mixture was adjusted from 4.74 to 5.50 with 2.11 g of $Ca(OH)_2$ slurried in water after which the mixture was filtered. 90 ml of filtrate was recovered, analysed with MP-AES and results are presented in Table 6.

TABLE 6

Composition of filtrate from leaching of AKB and manganese oxide after pH adjustment.

| Element | mg/l |
| --- | --- |
| Ca | <500 |
| K | 2 990 |
| Mn | 123 000 |
| Zn | 29 100 |

The filtrate from previous step was heated to boiling point. After the mixture started to form crystals the reaction was continued under reflux cooling for one hour. 15.24 g of crystals (DC 83.75%) was recovered by filtration using heated filtration equipment. Samples were analysed with MP-AES and results are presented in Table 7.

TABLE 7

Composition of dried manganese sulfate crystals from crystallization.

| Element | mg/l |
| --- | --- |
| Ca | <5 000 |
| K | 1 640 |
| Mn | 290 000 |
| Zn | 27 000 |

Crystals from previous step were dissolved in 50 ml of water forming a liquor with pH of 6.46 and volume of 52 ml. Prior to ion exchange, the resin was preconditioned with 40 ml of 10 wt % $NH_4OH$. The solution was circulated through 30 ml of bis-picolyl amine ion exchange resin for four hours. After ion exchange, 60 ml of raffinate was collected from the column. 40 ml of 20 wt % $H_2SO_4$ was used to extract zinc from the resin. Samples were analysed with MP-AES and results are presented in Table 8.

TABLE 8

Composition of the dissolved manganese sulfate crystals, the raffinate and eluate.

| Element | Liquor | Raffinate | Eluate |
| --- | --- | --- | --- |
| Ca | <500 | <500 | <500 |
| K | 392 | 210 | <50 |
| Mn | 48 900 | 31 000 | 445 |
| Zn | 3 490 | <50 | 3 600 |

Example 3

22.72 of washed AKB (DC 93.56%) and 13.31 g of a manganese trioxide ($Mn_2O_3$) was slurried in 55 ml of water and 20 ml of 95 wt % $H_2SO_4$. 25 ml of 30 wt % $H_2O_2$ was added gradually during three hours. After reductive leaching pH of the mixture was 2.27. Residual solids were removed from 92 ml of solution by filtration. Samples were analysed with MP-AES and results are presented in Table 9.

TABLE 9

Composition of AKB and manganese oxide leaching.

| Element | mg/l |
| --- | --- |
| Ca | <500 |
| K | 3 100 |
| Mn | 126 000 |
| Zn | 28 200 |

The filtrate from previous step was heated to boiling point and excess water was removed by means of evaporation. After the mixture started to form crystals the reaction was continued under reflux cooling for one hour. 29.97 g of crystals (DC 75.90%) was removed from 30 ml of mother liquor by filtration with heated filtration equipment. Samples were analysed with MP-AES and results are presented in Table 10.

TABLE 10

Composition of dried manganese sulfate crystals from crystallization.

| Element | mg/l |
| --- | --- |
| Ca | <5 000 |
| K | 2 730 |

TABLE 10-continued

Composition of dried manganese sulfate
crystals from crystallization.

| Element | mg/l |
|---|---|
| Mn | 284 000 |
| Zn | 45 600 |

Crystals from previous step were dissolved in 40 ml of water forming a liquor with pH of 3.28 and volume of 45 ml. Prior to ion exchange the resin was treated with 40 ml of 10 wt % $NH_4OH$. The solution was circulated through 30 ml of Lanxess MonoPlus TP220 for four hours. After ion exchange 52 ml of raffinate was collected from the column. 40 ml of 20 wt % $H_2SO_4$ was used to extract zinc from the resin and a series of elution samples was collected with volumes of 17 ml, 38 ml, 40 ml and 23 ml respectively. Samples are analysed with MP-AES and results are presented in Table 11.

TABLE 11

Composition of the dissolved manganese
sulfate liquor, raffinate and eluates.

| Element | Liquor | Raffinate | Eluate 1 | Eluate 2 | Eluate 3 | Eluate 4 |
|---|---|---|---|---|---|---|
| Ca | <500 | <500 | <500 | <500 | <500 | <500 |
| K | 655 | 469 | <50 | <50 | <50 | <50 |
| Mn | 72 400 | 49 000 | 25 | 68 | 14 | <5 |
| Zn | 10 300 | <50 | 3 570 | 8 350 | 1 540 | <250 |

Example 4

23.01 g of washed AKB (DC 88.62%) and 30.03 g of technical manganese sulfate hydrate were slurried in 80 ml of water and 10 ml of 95 wt % $H_2SO_4$. 12 ml of 30 wt % $H_2O_2$ was added gradually during one hour. After reductive leaching pH of the mixture was adjusted from 2.61 to 5.58 with 2.18 g of $Ca(OH)_2$ slurried in water. Residual solids were removed from 100 ml of solution by filtration. Samples were analysed with MP-AES and results are presented in Table 12.

TABLE 12

Composition of leachate from leaching of AKB in
presence of technical grade manganese sulfate.

| Element | mg/l |
|---|---|
| Ca | <500 |
| K | 2 810 |
| Mn | 120 000 |
| Zn | 26 100 |

The filtrate from previous step was heated to boiling point, and after the mixture started to form crystals the reaction was continued under reflux cooling for one hour. 19.09 g of crystals (DC 81.88%) was removed from 49 ml of mother liquor by filtration with heated filtration equipment. Samples were analysed with MP-AES and results are presented in Table 13.

TABLE 13

Composition of dried manganese sulfate
crystals from crystallization.

| Element | mg/l |
|---|---|
| Ca | <5000 |
| K | 1 480 |
| Mn | 287 000 |
| Zn | 24 800 |

Crystals from previous step were dissolved in 50 ml of water forming a solution with pH of 6.30 and volume of 55 ml. The solution was then circulated through 30 ml of Lanxess MonoPlus TP220 for four hours. Prior to ion exchange, the resin was preconditioned with 40 ml of 10 wt % $NH_4OH$. After ion exchange 63 ml of raffinate was collected from the column. 40 ml of 20 wt % $H_2SO_4$ was used to extract zinc from the resin and a series of elution samples was collected with volumes of 16 ml, 40 ml, 40 ml, and 45 ml respectively. Samples were analysed with MP-AES and results are presented in Table 14.

TABLE 14

Composition of the dissolved manganese
sulfate liquor, raffinate and eluates.

| Element | Liquor | Raffinate | Eluate 1 | Eluate 2 | Eluate 3 | Eluate 4 |
|---|---|---|---|---|---|---|
| Ca | <500 | <500 | <500 | <500 | <500 | <500 |
| K | 517 | 360 | <50 | <50 | <50 | <50 |
| Mn | 60 700 | 42 600 | 14 | 144 | 42 | 5 |
| Zn | 4 160 | <50 | <250 | 3 970 | 1 130 | <250 |

Example 5

22.05 of washed AKB (DC 93.56%) was slurried in 80 ml of water and 10 ml of 95 wt % $H_2SO_4$. 12 ml of 30 wt % $H_2O_2$ was added gradually for two hours. After reductive leaching pH of the mixture was adjusted from 5.65 to 6.59 with 4.35 g of $Ca(OH)_2$ slurried in water. Residual solids were removed from 90 ml of solution by filtration. 30.89 g of technical manganese sulfate hydrate was added to the filtrate and a solution with volume of 100 ml was obtained. The resulting solution was heated to boiling. After the mixture started to form crystals the reaction was continued under reflux cooling for one hour. 19.97 g of crystals (DC 83.89%) was removed from 37 ml of mother liquor by filtration with heated filtration equipment. Samples were analysed with MP-AES and results are presented in Table 15.

TABLE 15

Composition of the leachate before addition of manganese sulfate,
and the dried manganese sulfate crystals from crystallization.

| Element | Leachate | Crystals |
|---|---|---|
| Ca | 692 | <5000 |
| K | 620 | 1 560 |
| Mn | 35 800 | 326 000 |
| Zn | 3 880 | 4960 |

Crystals from previous step were dissolved 40 ml of water forming a solution with pH of 7.01 and volume of 40 ml. The solution was then circulated through 30 ml of Lanxess MonoPlus TP220 for four hours. Prior to ion exchange, the resin was preconditioned with 40 ml of 10 wt % NH$_4$OH. After ion exchange 52 ml of raffinate was collected from the column. 40 ml of 20 wt % H$_2$SO$_4$ was used to extract zinc from the resin and a series of elution samples was collected with volumes of 17 ml, 40 ml, 45 ml, and 20 ml respectively. Samples were analysed with MP-AES and results are presented in Table 16.

TABLE 16

Composition of the dissolved manganese sulfate liquor, raffinate and eluates.

| Element | Liquor | Raffinate | Eluate 1 | Eluate 2 | Eluate 3 | Eluate 4 |
|---|---|---|---|---|---|---|
| Ca | <500 | <500 | <500 | <500 | <500 | <500 |
| K | 606 | 330 | <50 | <50 | <50 | <50 |
| Mn | 92 000 | 49 500 | <50 | 100 | <50 | <50 |
| Zn | 1 140 | <50 | <250 | 900 | 365 | <250 |

Example 6

41.05 g of washed AKB (DC 95%) was slurried in 80 ml of water and 20 ml of 95 wt % H$_2$SO$_4$. 25 ml of 30 wt % H$_2$O$_2$ was added gradually for two hours. After reductive leaching pH of the mixture was 4.76. Residual solids were removed from 90 ml of solution by filtration. The filtrate was heated to boiling point and excess water was removed by means of evaporation. After the mixture started to form crystals the reaction was continued under reflux cooling for one hour. 26.24 g of crystals (DC 81.22%) was removed from 30 ml of mother liquor by filtration with heated filtration equipment. Samples were analysed with MP-AES and results are presented in Table 17.

TABLE 17

Composition of the leachate of AKB and the resulting crystals from crystallization.

| Element | Leachate | Crystals |
|---|---|---|
| Ca | <500 | <5000 |
| K | 4 670 | 8 030 |
| Mn | 81 000 | 225 000 |
| Zn | 47 500 | 93 800 |

6.30 g of crystals from previous step and 10.01 g of technical manganese sulfate hydrate were dissolved in 40 ml of water forming a solution with pH of 6.37 and volume of 44 ml. The solution was then circulated through 30 ml of Lanxess MonoPlus TP220 for four hours. Prior to ion exchange, the resin was preconditioned with 40 ml of 10 wt % NH$_4$OH. After ion exchange 52 ml of raffinate was collected from the column. 40 ml of 20 wt % H$_2$SO$_4$ was used to extract zinc from the resin and a series of elution samples was collected with volumes of 12 ml, 43 ml, 45 ml, and 26 ml respectively. Samples are analysed with MP-ABS and results are presented Table 18.

TABLE 18

Composition of the dissolved manganese sulfate liquor, raffinate and eluates.

| Element | Liquor | Raffinate | Eluate 1 | Eluate 2 | Eluate 3 | Eluate 4 |
|---|---|---|---|---|---|---|
| Ca | <500 | <500 | <500 | <500 | <500 | <500 |
| K | 430 | 420 | <50 | <50 | <50 | <50 |
| Mn | 81 300 | 59 000 | 10 | 110 | 50 | <5 |
| Zn | 8 890 | <50 | <250 | 8 410 | 1780 | <250 |

Example 7

40.50 g of washed AKB (DC 95%) was slurried in 80 ml of water and 20 ml of 95 wt-% H$_2$SO$_4$. 25 ml of 30 wt % H$_2$O$_2$ was added gradually during three to four hours. After reductive leaching pH of the mixture was adjusted from 4.91 to 5.54 with 4.14 g of Ca(OH)$_2$ slurried in water. Residual solids were removed from 95 ml of solution by filtration. The filtrate was heated to boiling point and excess water was removed by means of evaporation. After the mixture started to form crystals the reaction was continued under reflux cooling for one hour. 17.68 g of crystals (DC 79.36%) was removed from 27 ml of mother liquor by filtration with heated filtration equipment. Samples were analysed with MP-AES and results are presented in Table 19.

TABLE 19

Composition of the leachate from AKB leaching and the resulting crystals from crystallization.

| Element | Leachate | Crystals |
|---|---|---|
| Ca | <500 | <5000 |
| K | 3 710 | 4 830 |
| Mn | 65 400 | 246 000 |
| Zn | 34 100 | 98 500 |

8.53 g of crystals from previous step and 8.26 g of technical manganese sulfate hydrate were dissolved in 40 ml of water forming a solution with pH of 6.02 and volume of 40 ml. The solution was then circulated through 30 ml of Lanxess MonoPlus TP220 for four hours. Prior to ion exchange, the resin was preconditioned with 40 ml of 10 wt % NH$_4$OH. After ion exchange 42 ml of raffinate was collected from the column. 40 ml of 20 wt % H$_2$SO$_4$ was used to extract zinc from the resin and a series of elution samples was collected with volumes of 15 ml, 41 ml, 38 ml and 18 ml respectively. Samples were analysed with MP-AES and results are presented in Table 20.

TABLE 20

Composition of the dissolved manganese sulfate liquor, raffinate and eluates.

| Element | Liquor | Raffinate | Eluate 1 | Eluate 2 | Eluate 3 | Eluate 4 |
|---|---|---|---|---|---|---|
| Ca | <500 | <500 | <500 | <500 | <500 | <500 |
| K | 920 | 680 | <50 | <50 | <50 | <50 |
| Mn | 93 800 | 64 800 | 10 | 110 | 40 | <5 |
| Zn | 11 500 | <50 | 500 | 8 550 | 1 980 | <250 |

Example 8

24.56 g of AKB and 20.36 g of AM were slurried in 55 ml of water and 20 ml of 95% H$_2$SO$_4$. 25 ml of 30 wt % H$_2$O$_2$ was added gradually during three to four hours. After reductive leaching pH of the mixture was adjusted from 0.17 to 5.77 with 8.71 g of Ca(OH)$_2$ slurried in water. Residual solids were removed from 70 ml of solution by filtration. The filtrate was heated to boiling point and excess water was removed by means of evaporation. After the mixture started to form crystals the reaction was continued under reflux cooling for one hour. 9.39 of crystals (DC 84.35%) was removed from 33 ml of mother liquor by filtration with heated filtration equipment. Samples were analysed with MP-AES and results are presented in Table 21.

TABLE 21

Composition of the leachate from AKB leaching and the resulting crystals from crystallization.

| Element | Leachate | Crystals |
|---|---|---|
| Ca | <500 | <5 000 |
| K | 10 700 | 30 800 |
| Mn | 104 000 | 262 000 |
| Zn | 25 100 | 22 400 |

Crystals from previous step were dissolved in 20 ml of water forming a solution with pH of 6.46 and volume of 24 ml. The solution was then circulated through 30 ml of Lanxess MonoPlus TP220 for four hours. Prior to ion exchange, the resin was preconditioned with 40 ml of 10 wt % NH$_4$OH. After ion exchange 47 ml of raffinate was collected from the column. 40 ml of 20 wt % H$_2$SO$_4$ was used to extract zinc from the resin and a series of elution samples was collected with volumes of 14 ml, 30 ml, 40 ml, and 40 ml respectively. Samples were analysed with MP-AES and results are presented in Table 22.

TABLE 22

Composition of the dissolved manganese sulfate liquor, raffinate and eluates.

| Element | Liquor | Raffinate | Eluate 1 | Eluate 2 | Eluate 3 | Eluate 4 |
|---|---|---|---|---|---|---|
| Ca | <500 | <500 | <500 | <500 | <500 | <500 |
| K | 6 870 | 3 050 | <50 | <50 | <50 | <50 |
| Mn | 54 300 | 20 900 | 50 | 440 | 230 | 100 |
| Zn | 4 560 | <50 | <250 | 2 850 | 1 310 | <250 |

Example 9

70 mL of a mixed AKB and AM liquor was passed through 40 ml of unpreconditioned bis-picolylamine ion exchange resin, after which 78 ml of solution was recovered from the column. The resin was first rinsed with water and then eluted with 50 ml of 20 wt-% H$_2$SO$_4$ and a series of samples in aliquots of approximately 13 ml were collected. Samples were analyzed with MP-AES and the results are in Table 23.

TABLE 23

Composition of the dissolved manganese sulfate liquor, raffinate and eluates.

| Element | Liquor | Raffinate | Eluate 1 | Eluate 2 | Eluate 3 | Eluate 4 |
|---|---|---|---|---|---|---|
| Ca | 380 | 240 | <60 | <60 | <60 | <60 |
| K | 1 040 | 500 | <60 | <50 | <50 | <50 |
| Mn | 39 710 | 23 870 | <5 | 10 | 8 | <5 |
| Zn | 4 900 | 120 | 60 | 3 200 | 2 390 | 220 |

A summary of the relevant parameter differences in Examples 1 to 8 can be found in Table 24.

TABLE 24

Summary of parameters used in the disclosed examples.

| Process step | Ex 1 | Ex 2 | Ex 3 | Ex 4 | Ex 5 | Ex 6 | Ex 7 | Ex 8 | Ex 9 |
|---|---|---|---|---|---|---|---|---|---|
| AKB Washing (optional) | Yes | Yes | Yes | Yes | Yes | Yes | Yes | No | No |
| Mn containing material | AM | Mn2O3 | Mn2O3 | MnSO4•H2O | MnSO4•H2O | MnSO4•H2O | MnSO4•H2O | AM | AM |
| Mn material added before step Leaching | Leaching | Leaching | Leaching | Leaching | Crystallization | Ion Exchange | Ion Exchange | Leaching | Leaching |
| H2O2 addition time | 2 h | 3.5 h | 3 h | 1 h | 2 h | 2 h | 3.5 h | 3.5 h | 3.5 h |
| Dissolving time after H2O2 addition | 0.5 h | — | — | — | — | — | — | — | — |
| Temperature | RT | RT | RT | RT | RT | RT | RT | RT | RT |
| pH adjustment (optional) Crystallization | No | Yes | No | Yes | Yes | No | Yes | Yes | Yes |
| Time Ion Exchange | 1 h | 1 h | 1 h | 1 h | 1 h | 1 h | 1 h | 1 h | 1 h |
| pH adjustment (optional) | Yes | No | No | No | No | No | No | No | No |
| pH | 2.5 | 6.5 | 3.3 | 6.3 | 7 | 6.4 | 6.02 | 6.46 | 3 |
| Zn separation | 100% | 100% | 100% | 100% | 100% | 100% | 100% | 100% | 90% |

Based on the above experiments, it can be concluded that the process works with or without washing of AKB, at several pH-areas and better with preconditioning of the resin when comparing examples 1-8 to example 9, which had no preconditioning of the resin. Similarly, the process works with different manganese sources.

The invention claimed is:

1. A method for recovering metals from ground alkaline batteries comprising the steps of:
   a. selectively leaching under reductive conditions manganese and zinc from alkaline black by mixing the alkaline black and a manganese oxide-containing material and/or manganese sulfate with a sulfuric acid solution at a leaching temperature of 15-40° C., for 1-5 hours to obtain a mixture,
   b. filtering the mixture to obtain a manganese and zinc sulfate filtrate and a Pb/Ca/organics as a filter cake, wherein the manganese and zinc sulfate filtrate obtained in the filtering step (step b) has a manganese to zinc ratio between 10:1 and 3.6:1,
   c. heating the manganese and zinc sulfate filtrate to a crystallization temperature of 70-100° C. and keeping the crystallization temperature under reflux cooling for at least 30 minutes to precipitate manganese in a form of manganese sulfate crystals,
   d. filtrating the manganese sulfate crystals and obtaining a manganese-depleted filtrate, and
   e. solubilizing the manganese sulfate crystals in water to obtain a zinc-containing manganese sulfate solution and separating manganese and zinc from the zinc-containing manganese sulfate solution by a chelating ion exchange.

2. The method for recovering according to claim 1, wherein the manganese oxide containing material is $MnO_2$.

3. The method for recovering according to claim 1, wherein the manganese oxide containing material is manganese trioxide.

4. The method for recovering according to claim 1, wherein the manganese and zinc sulfate filtrate obtained in the filtering step (step b) has a manganese to zinc ratio between 7:1 and 5:1.

5. The method for recovering according to claim 1, wherein manganese sulfate is added in a stage preceding the chelating ion exchange to adjust the manganese to zinc ratio.

6. The method for recovering according to claim 1, wherein the mixture to be filtered in the filtering step (step b) has a pH between 1.5 and 7.

7. The method for recovering according to claim 6, wherein the pH is adjusted upwards with a hydroxide solution, or downwards with sulfuric acid preceding the filtering step (step b).

8. The method for recovering according to claim 1, wherein the sulfate solution, wherefrom manganese and zinc are separated, has a pH between 1.5 and 7 before entering the chelating ion exchange in step (e).

9. The method for recovering according to claim 8, wherein the pH is adjusted upwards with a hydroxide solution, or downwards with sulfuric acid in a stage preceding the chelating ion exchange (step e).

10. The method for recovering according to claim 1, wherein the alkaline black is washed before the selective leaching step (step a) by mixing the alkaline black with water at a temperature between 5° C. and 100° C. for at least 30 min.

11. The method for recovering according to claim 10, wherein the alkaline black is mixed with water at a temperature between 20° C. and 25° C.

12. The method for recovering according to claim 10, wherein the alkaline black is mixed with water for 1-2 hours.

13. The method for recovering according to claim 1, wherein the manganese depleted filtrate from the filtrating of the sulfate crystals (step d) is returned to the leaching step (step a).

14. The method for recovering according to claim 1, wherein in the chelating ion exchange step a BPA-resin in sulfate form is used.

15. The method for recovering according to claim 14, wherein the BPA-resin in sulfate form is preconditioned with ammonium, sodium or potassium hydroxide.

16. The method for recovering according to claim 1, wherein in the selective leaching step (step a) a reducing agent is added during the mixing until manganese and zinc are dissolved.

17. The method according to claim 16, wherein the reducing agent comprises hydrogen peroxide or sulfur dioxide.

18. The method according to claim 1, wherein the manganese oxide containing material is anode mud.

19. The method according to claim 1, wherein the process does not include a solvent exchange step.

* * * * *